United States Patent
Barnette, Jr. et al.

(10) Patent No.: US 9,207,407 B2
(45) Date of Patent: Dec. 8, 2015

(54) FIBER OPTIC CONNECTOR AND BONDED COVER

(71) Applicant: CORNING OPTICAL COMMUNICATIONS LLC, Hickory, NC (US)

(72) Inventors: Robert Elvin Barnette, Jr., Hickory, NC (US); David Lee Dean, Jr., Hickory, NC (US); Matthew Wade Smith, Lenoir, NC (US); Wesley Allan Yates, Lenoir, NC (US)

(73) Assignee: Corning Optical Communications LLC, Hickory, NC (US)

( * ) Notice: Subject to any disclaimer, the term of this patent is extended or adjusted under 35 U.S.C. 154(b) by 0 days.

(21) Appl. No.: 14/673,965

(22) Filed: Mar. 31, 2015

(65) Prior Publication Data
US 2015/0205055 A1 Jul. 23, 2015

Related U.S. Application Data

(63) Continuation of application No. 13/760,586, filed on Feb. 6, 2013, now Pat. No. 8,998,503.

(60) Provisional application No. 61/647,787, filed on May 16, 2012.

(51) Int. Cl.
| | |
|---|---|
| *G02B 6/26* | (2006.01) |
| *G02B 6/38* | (2006.01) |
| *G02B 6/36* | (2006.01) |
| *B29C 65/50* | (2006.01) |
| *B32B 37/12* | (2006.01) |
| *B32B 37/18* | (2006.01) |
| *H01R 13/52* | (2006.01) |

(Continued)

(52) U.S. Cl.
CPC .............. *G02B 6/3849* (2013.01); *B29C 65/50* (2013.01); *B32B 37/12* (2013.01); *B32B 37/18* (2013.01); *G02B 6/26* (2013.01); *G02B 6/36* (2013.01); *G02B 6/3826* (2013.01); *B29L 2011/0075* (2013.01); *B32B 2038/0064* (2013.01); *B32B 2551/00* (2013.01); *G02B 6/3885* (2013.01); *H01R 13/5213* (2013.01)

(58) Field of Classification Search
CPC .......................................................... G02B 6/26
USPC ..................................................... 385/76, 78
See application file for complete search history.

(56) References Cited

U.S. PATENT DOCUMENTS 4,640,575 A * 2/1987 Dumas .................. G02B 6/3849
292/1
4,991,929 A * 2/1991 Bowen .................. G02B 6/3818
385/50

(Continued)

FOREIGN PATENT DOCUMENTS

EP 0152422 B1 11/1987 ............... G02B 6/26
WO WO 2009/040565 A1 4/2009 ............... G02B 6/38

*Primary Examiner* — Kaveh Kianni

(57) ABSTRACT

A fiber optic assembly includes a connector and a cover bonded to an end face of the connector. The connector includes a ferrule, where an optical fiber extends through the ferrule and to the end face of the connector. An end of the optical fiber is polished proximate to the end face. The cover is bonded directly to the end face of the connector, and overlays the polished end of the optical fiber such that the cover protects the optical fiber, limits access of dust to the end face of the connector, and draws loose particulates from the end face upon removal of the cover.

14 Claims, 9 Drawing Sheets

(51) Int. Cl.
*B29L 11/00* (2006.01)
*B32B 38/00* (2006.01)

(56) References Cited

U.S. PATENT DOCUMENTS

| | | | | |
|---|---|---|---|---|
| 5,220,703 | A * | 6/1993 | Kanayama | B08B 1/00 15/210.1 |
| 5,516,581 | A * | 5/1996 | Kreckel | A47G 1/175 428/317.3 |
| 5,956,793 | A * | 9/1999 | Cox | B08B 7/0028 15/104.002 |
| 6,004,042 | A * | 12/1999 | Million | G02B 6/3807 385/59 |
| 6,116,129 | A * | 9/2000 | Takayama | B26D 1/0006 400/621 |
| 6,209,162 | B1 * | 4/2001 | Clairadin | B08B 1/00 15/210.1 |
| 6,209,163 | B1 * | 4/2001 | Clairadin | B08B 1/00 15/210.1 |
| 6,227,717 | B1 | 5/2001 | Ott et al. | 385/53 |
| 6,634,732 | B2 * | 10/2003 | Farr | B41J 2/17536 347/29 |
| 6,681,437 | B1 * | 1/2004 | Miyake | B08B 1/00 15/210.1 |
| 6,853,794 | B2 * | 2/2005 | Lu | B08B 3/12 134/184 |
| 6,854,152 | B2 * | 2/2005 | Loder | B08B 1/00 151/104.94 |
| 7,186,038 | B2 | 3/2007 | Hovland et al. | 385/94 |
| 7,566,176 | B2 * | 7/2009 | Lytle | B08B 3/02 385/134 |
| 7,588,375 | B2 | 9/2009 | Hovland et al. | 385/94 |
| 7,611,222 | B2 * | 11/2009 | Cray | B41J 2/1433 347/29 |
| 8,118,494 | B2 | 2/2012 | Larson et al. | 385/60 |
| 8,126,307 | B2 | 2/2012 | Hovland et al. | 385/139 |
| 2002/0166190 | A1 * | 11/2002 | Miyake | B08B 1/00 15/210.1 |
| 2003/0002815 | A1 | 1/2003 | Tanaka et al. | 385/78 |
| 2003/0039463 | A1 * | 2/2003 | Miyake | G02B 6/25 385/147 |
| 2003/0098045 | A1 * | 5/2003 | Loder | B08B 1/00 134/8 |
| 2004/0033353 | A1 * | 2/2004 | You | B65H 37/007 428/343 |
| 2004/0086710 | A1 * | 5/2004 | Pitzen | A47G 1/175 428/343 |
| 2005/0105859 | A1 * | 5/2005 | Gerhard | B08B 3/02 385/85 |
| 2005/0147361 | A1 * | 7/2005 | Hovland | G02B 6/4471 385/94 |
| 2005/0286853 | A1 * | 12/2005 | Fujiwara | B08B 1/00 385/134 |
| 2006/0045428 | A1 * | 3/2006 | Theuerkorn | G02B 6/3831 385/53 |
| 2008/0034519 | A1 * | 2/2008 | Fujiwara | B08B 1/008 15/104.001 |
| 2009/0310923 | A1 * | 12/2009 | Hovland | G02B 6/4471 385/94 |
| 2009/0313795 | A1 * | 12/2009 | Hardee | A44B 18/0046 24/596.1 |
| 2010/0098381 | A1 * | 4/2010 | Larson | G02B 6/3846 385/60 |
| 2010/0303425 | A1 | 12/2010 | Liu | 385/94 |
| 2010/0319152 | A1 * | 12/2010 | Prizepasniak | A47L 13/20 15/210.1 |
| 2011/0220268 | A1 * | 9/2011 | Nishio | B32B 7/12 156/85 |
| 2012/0057841 | A1 * | 3/2012 | Wysocki | G02B 6/243 385/139 |
| 2012/0321255 | A1 * | 12/2012 | Kewitsch | G02B 6/3502 385/78 |
| 2013/0183862 | A1 * | 7/2013 | Ni | H01R 12/71 439/620.22 |
| 2014/0072265 | A1 * | 3/2014 | Ott | G02B 6/4429 385/87 |
| 2014/0124140 | A1 * | 5/2014 | Verheyden | G02B 6/3833 156/350 |

* cited by examiner

FIBER OPTIC CONNECTOR AND BONDED COVER

PRIORITY APPLICATIONS

This is a continuation of U.S. patent application Ser. No. 13/760,586, filed on Feb. 6, 2013, which claims the benefit of priority to U.S. Provisional Application No. 61/647,787, filed on May 16, 2012, the content of both applications being incorporated herein by reference.

BACKGROUND

The present disclosure relates generally to fiber optic connectors, and more specifically to an adhesive cover for protecting and cleaning an end face of a fiber optic connector.

Fiber optic connectors typically include a ferrule that surrounds and supports an optical fiber on an end face of the connector. The optical fiber is finely polished in order to provide a clean and clear interface with an adjoining optical fiber supported by an adapter receiving the connector. Small scratches (e.g., on the order of micro-meters) and dust particles can greatly impact the performance of the connector. Accordingly, connectors are often transported and stored with end caps or dust covers that are designed to shield the end face.

Applicants have found, even with a dust cover, connectors may still become contaminated with particulates. Particles from the interior of the dust cap may migrate to the end face of the connector, especially when the connectors are being transported, presumably due to movement of the connectors and corresponding air currents mobilizing the particles. Further, micro-passages may facilitate communication of very small particles to the end face of the connector even when the end cap is installed. Such passages may be inherently present due to limits of tolerances in the dimensions of the connector bodies and end caps.

Despite the extremely small size, attenuation and damage to the end face of a connector may still be produced by such particles. Signal losses due to the associated attenuation may be pose a problem, particularly for connectors used with fiber optic networks that operate at ever increasing speeds due to improvements in the rate of data transmission. Accordingly, end users are typically required to clean connectors before installation. Much time is required for cleaning. There is also some risk of damaging connectors due to cleaning. A need exists for an end cap or dust cover providing a cleaner and more damage-free end face of a fiber optic connector.

SUMMARY

One embodiment relates to a fiber optic assembly, which includes a connector and an adhesive cover. The connector includes a ferrule, wherein an optical fiber extends through the ferrule and to an end face of the connector. An end of the optical fiber is polished proximate to the end face. The adhesive cover is bonded directly to the end face of the connector and overlays the polished end of the optical fiber such that the adhesive cover is configured draw loose particulates of dust and debris from the end face of the connector upon removal. The adhesive cover is also bonded to an exterior side of the connector in addition to the end face of the connector. Further, the adhesive cover includes an exposed portion that is not bonded directly to the connector and that defines a terminal end of the adhesive cover. The fiber optic assembly also includes an end cap positioned over a portion of the connector and the adhesive cover. The exposed portion of the adhesive cover extends from an interface between the end cap and the connector. Additionally, the exposed portion is configured to allow for peeling of the adhesive cover from the connector in a single direction for removal.

Another embodiment relates to a fiber optic assembly, which includes a connector and an adhesive cover. The connector includes a ferrule, wherein an optical fiber extends through the ferrule and to an end face of the connector. An end of the optical fiber is polished proximate to the end face of the connector. The adhesive cover is bonded directly to the end face of the connector and comprises a tape that overlays the polished end of the optical fiber. The adhesive cover is configured draw loose particulates of dust and debris from the end face of the connector upon removal. The fiber optic assembly also includes an end cap positioned over a portion of the connector and the tape, wherein the tape is bonded to an exterior side of the connector in addition to the end face of the connector. The tape includes a portion that is exposed from an interface between the end cap and the connector so as to allow for peeling of the tape from the connector in a single direction for removal.

Yet another embodiment relates to a method of manufacturing a fiber optic assembly. The method includes a step of extending an optical fiber through a ferrule of a fiber optic connector and to an end face of the connector. The method further includes steps of polishing an end of the optical fiber, and positioning the end of the optical fiber proximate to the end face of the connector. In addition, the method includes a step of bonding an adhesive cover to the end face of a fiber optic connector, wherein the adhesive cover overlays the polished end of the optical fiber and is bonded to an exterior side of the connector in addition to the end face of the connector. The method also involves positioning an end cap over a portion of the connector and the adhesive cover, wherein the adhesive cover includes an exposed portion that is not bonded directly to the connector and that defines a terminal end of the adhesive cover. The exposed portion of the adhesive cover extends from an interface between the dust cap and the connector such that the exposed portion is configured to allow for peeling of the adhesive cover from the connector in a single direction for removal.

Additional features and advantages will be set forth in the Detailed Description which follows, and in part will be readily apparent to those skilled in the art from the description or recognized by practicing the embodiments as described in the written description and claims hereof, as well as the appended drawings. It is to be understood that both the foregoing general description and the following Detailed Description are merely exemplary, and are intended to provide an overview or framework to understand the nature and character of the claims.

BRIEF DESCRIPTION OF THE FIGURES

The accompanying drawings are included to provide a further understanding, and are incorporated in and constitute a part of this specification. The drawings illustrate one or more embodiment(s), and together with the Detailed Description serve to explain principles and operation of the various embodiments. As such, the disclosure will become more fully understood from the following Detailed Description, taken in conjunction with the accompanying Figures, in which.

DETAILED DESCRIPTION

Before turning to the Figures, which illustrate exemplary embodiments in detail, it should be understood that the present invention is not limited to the details or methodology set forth in the Detailed Description or illustrated in the Figures. For example, as will be understood by those of ordinary skill in the art, features and attributes associated with embodiments shown in one of the Figures may be applied to embodiments shown in others of the Figures.

Figure 1:
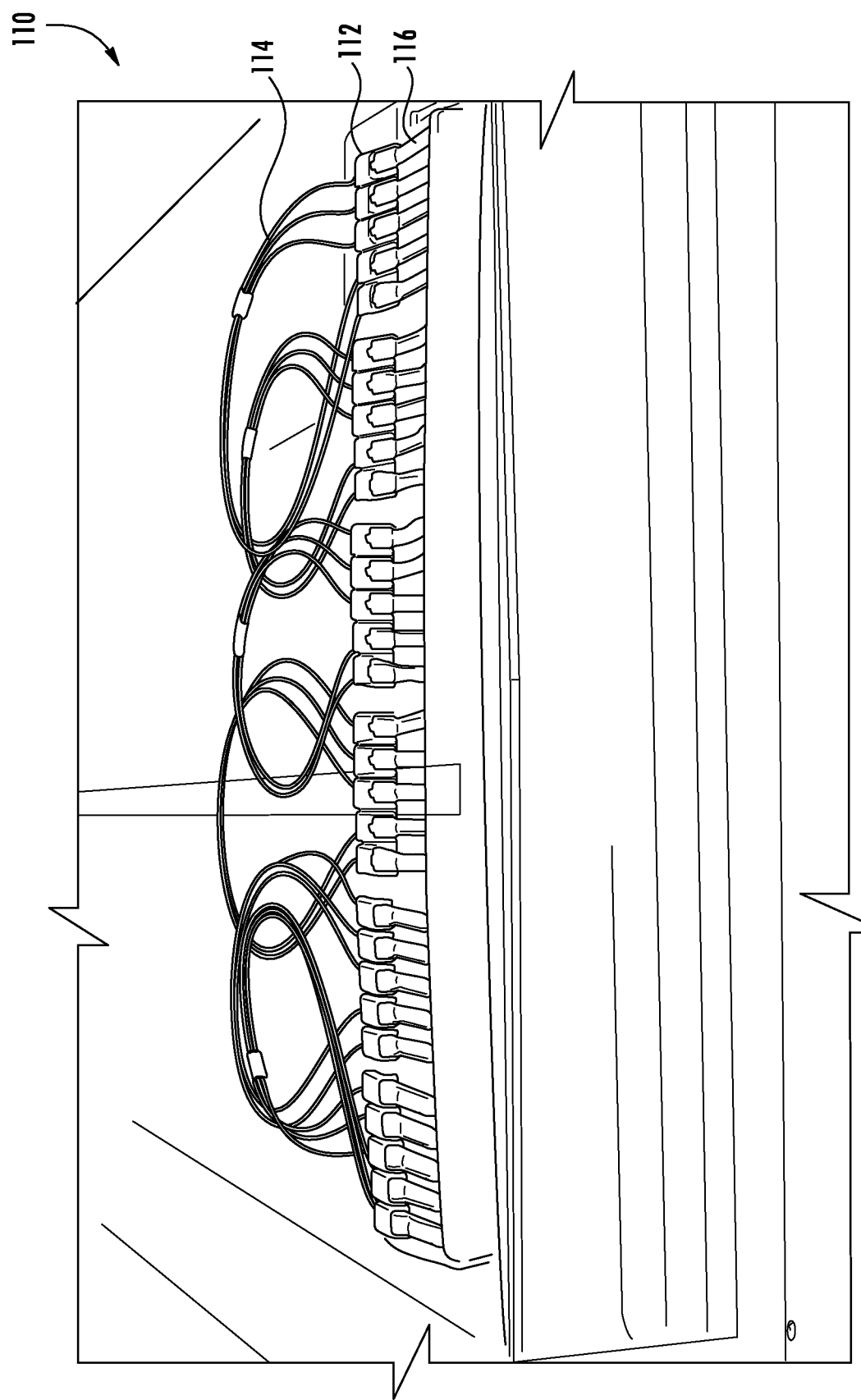
FIG. 1 is a perspective-view digital image of a group of connectorized fiber optic assemblies, according to an exemplary embodiment, undergoing testing in an environmental-test chamber.
Figure 4:
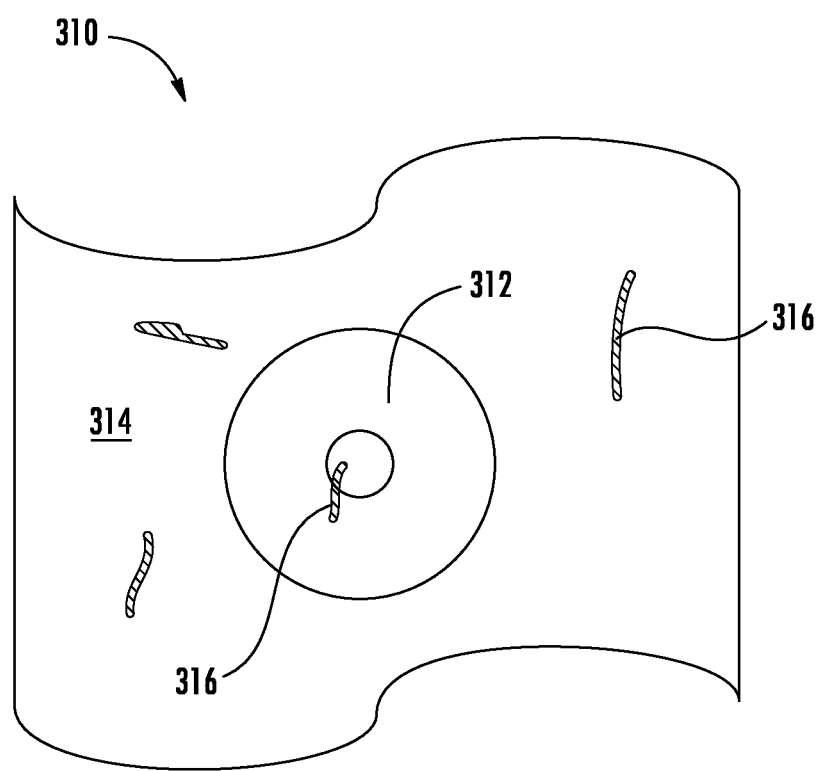
FIG. 4 is a schematic diagram of an end face of a fiber optic connector.

Referring to FIG. 1, a fiber optic assembly 110 includes a connector 112 (e.g., fiber optic connector, single-fiber or multi-fiber connector) attached to a fiber optic cable 114, such as an indoor flame-retardant jumper, a connectorized tether, or another type of fiber optic cable. The fiber optic cable 114 includes an optical fiber (see, e.g., end of fiber 312 as shown in FIG. 4), which may be one of a group of optical fibers bound together in a fiber ribbon or loosely passing through a buffer tube or jacket cavity together. According to an exemplary embodiment, the optical fiber extends through the fiber optic cable 114 and to the connector 112. In some embodiments the optical fiber is a continuous, integral fiber; whereas in other embodiments the optical fiber is a combination of more than one fiber segment spliced together end-to-end.

As shown in FIG. 1, the fiber optic assembly 110 includes an adhesive cover 116 coupled to an end of the connector 112. The adhesive cover 116 is intended to protect a polished end of the optical fiber on an end face of the connector from inadvertent scratching, to limit access of dust to the end face, and to additionally draw loose particulates of dust and debris from the end face of the connector 112 upon removal of the adhesive cover 116 from the connector 112, such as by drawing particulates away from the end face while peeling the adhesive cover 116 off of the connector 112.

Figure 2:
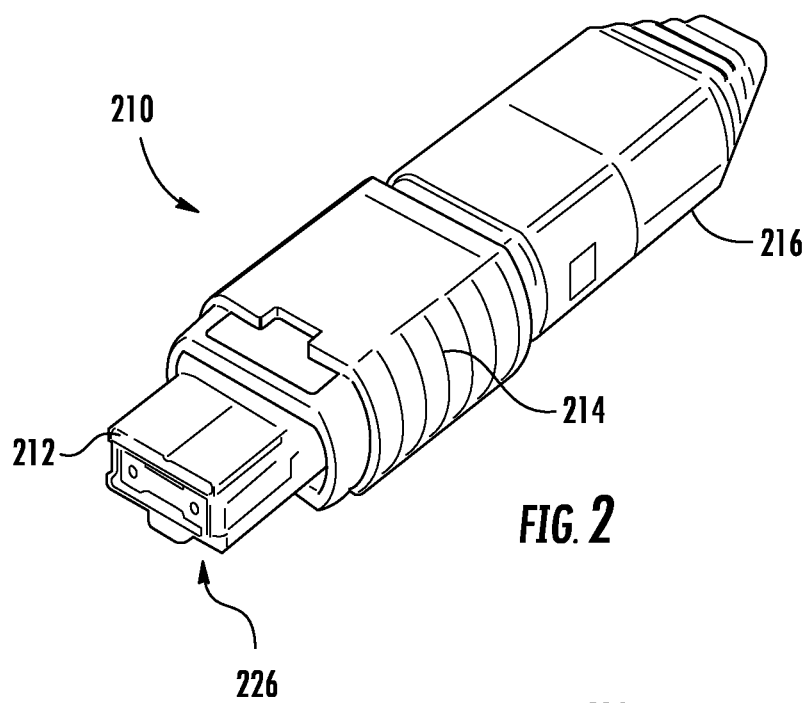
FIG. 2 is a perspective-view digital image of an multi-fiber push-on/pull-off (MTP) fiber optic connector.
Figure 3:
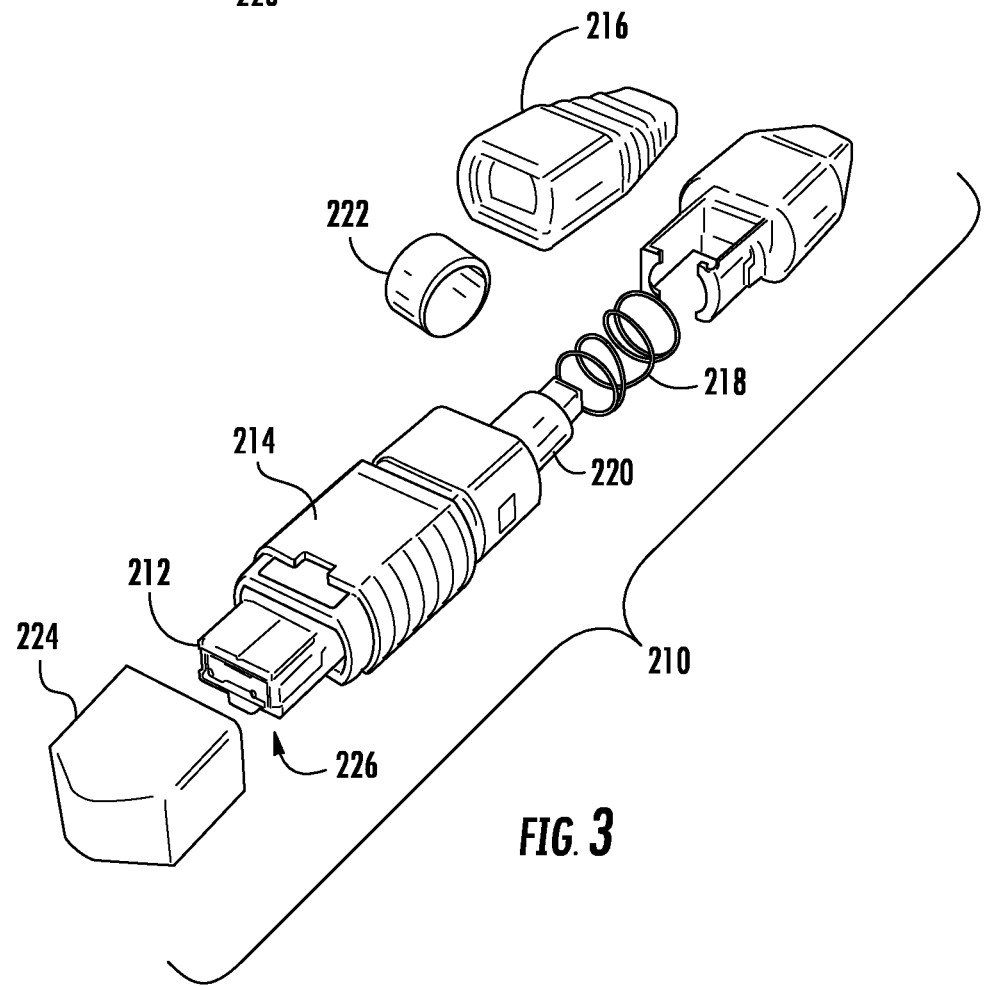
FIG. 3 is an exploded perspective-view digital image of the MTP connector of FIG. 2.

Referring to FIGS. 2-3, a fiber optic connector 210 includes a ferrule 212 (e.g., ceramic ferrule, plastic ferrule, metal ferrule), a housing 214 or shell supporting the ferrule 212, and a boot 216 to prevent over-bending of a fiber optic cable coupled to the connector 210. In some embodiments, the connector 210 further includes a spring 218 for absorbing strain from the cable, a fiber guide 220, a crimp band 222, and/or other features. According to an exemplary embodiment, the connector further includes a rigid end cap 224 (e.g., dust cap, cover) configured to be coupled to the connector over an end face 226 of the connector 210.

When assembled, an optical fiber extends through the ferrule 212 and to the end face 226 of the connector 210. Typically, during factory manufacturing, an end of the optical fiber is polished proximate to the end face 226 of the connector, such as flush with the end face 226, slightly beyond or beneath the end face 226 (e.g., within 100 micrometers). According to an exemplary embodiment, at least five additional optical fibers extend through the ferrule 212, and are spaced apart and linearly aligned with one another on the end face 226 of the connector 210 forming a straight row of circular end cross-sections (e.g., ●●●●●●).

Referring to FIG. 4, a connector, similar to the connector 210, includes an end face 310 where a portion of a ferrule 314 laterally surrounds a polished end of an optical fiber 312. Loose particulates 316 of dust and debris are present on the end face 310 of the connector.

Figure 5:
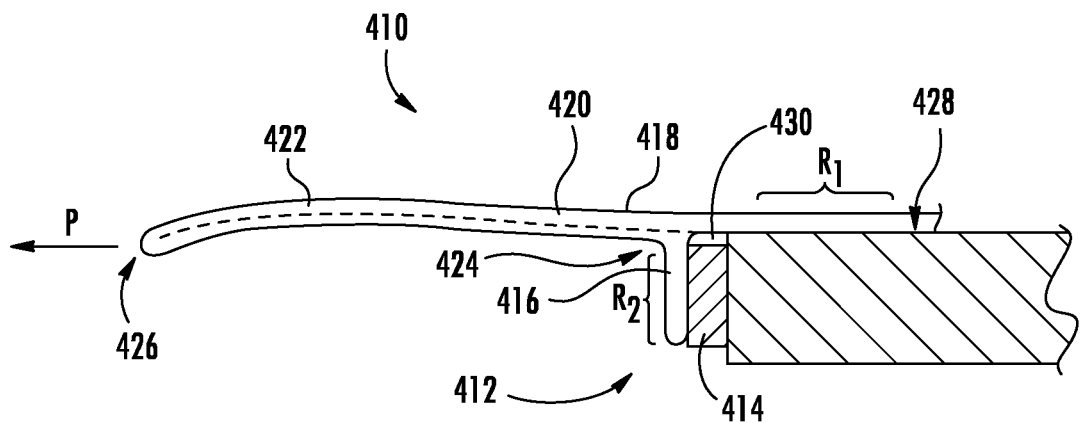
FIG. 5 is a side view of a fiber optic connector protected by an adhesive cover according to an exemplary embodiment.

Referring to FIG. 5, a connector 410, similar to the connector 210, includes an end face 412, a ferrule 414, and an adhesive cover 416 connected thereto. The adhesive cover 416 includes a substrate 418 and an adhesive agent 420 (e.g., glue) bonded to the substrate 418. According to an exemplary embodiment, the adhesive cover 416 is attached directly to the end face 412 of the connector 410, and the adhesive agent 420 is positioned between the substrate 418 and the end face 412 of the connector 410. Accordingly, the adhesive agent 420 bonds the adhesive cover 416 to the connector 410.

According to an exemplary embodiment, the adhesive cover 416 includes (e.g., comprises, consists essentially of, consists of) a tape. In some embodiments, the tape is 3M™ Polyimide Film Electrical Tape 92 (amber), which includes a polyimide substrate (i.e., film backing) with a silicone-based adhesive agent and is about a thousandth-of-an-inch thick and ¾ inches wide, designed for heat resistance, and designed to be usable at very low temperatures. In other embodiments, other brands and types of tape may be used. The tape is believed to leave no residue on a fiber optic connector end face, as disclosed herein, formed from plastics, ceramics, and/or metals. The substrate of the tape may be polymeric, or formed from another material (e.g., aluminum foil). The tape may be elongate, having a rectangular shape, or may be otherwise shaped. For example, the tape may be rectangular and include cut-outs for guide pins of a connector to pass through.

According to an exemplary embodiment, the adhesive cover 416 is coupled to the end face 412 of the connector 410. In some embodiments, the adhesive cover 416 overlays the polished end of the optical fiber (see fiber 312 as shown in FIG. 4). In some such embodiments, the adhesive cover 416 completely covers the polished end of the optical fiber. In some of those embodiments, the entire surface of the polished end of the optical fiber contacts the adhesive cover 416. The adhesive cover 416 may provide an airtight seal that isolates the polished end of the optical fiber from environment surrounding the end face 412 of the connector 410 (e.g., air within a rigid dust cap).

In contemplated embodiments, the adhesive cover 416 directly contacts the end face 412 of the connector such that no air gaps are present between the adhesive cover 416 and the polished end of the optical fiber. Furthermore, in some embodiments, a portion of the ferrule 414 laterally surrounds the polished end of the optical fiber (see ferrule 314 as shown in FIG. 4), and the adhesive cover 416 directly contacts and is bonded to that portion of the ferrule 414. Accordingly, the adhesive cover 416 is configured to protect the polished end of the optical fiber from inadvertent scratching, and limit access of dust to the end face 412 of the connector 410.

According to an exemplary embodiment, bonding between the adhesive agent 420 and the substrate 418 (and cohesion and bonding of the adhesive agent with itself) is greater than bonding between the adhesive agent 420 and the polished end of the optical fiber such that, upon removal of the adhesive cover 416 from the connector 410, the polished end of the optical fiber is completely free of residue from the adhesive agent 420. Put another way, the adhesive agent 420 of the cover 416 leaves little or no residue on the connector end-face 412. Furthermore, the adhesive cover 416 is configured to draw loose particulates of dust and debris from the end face 412 of the connector 410 upon removal of the adhesive cover 416, and thereby clean the end face 412.

Still referring to FIG. 5, the adhesive cover 416 includes a tab 422 (e.g., handle), which is not directly bonded to the connector, and the tab 422 provides a gripping surface from which to remove (e.g., peel) the adhesive cover 416 from the end face 412 of the connector 410. In some embodiments, the tab 422 consists entirely of two layers of the substrate 418 that have been folded together with the adhesive agent 420 therebetween. The tab 422 may be connected to the connector 410 only on one end 424 of the tab 422, and may be free on the opposite end 426 to be pulled, lifted, peeled, etc.

In some embodiments, the tab 422 may be used as an attachment point for drawing the connector 410 through a duct or other narrow passage. The folded-over region of the adhesive cover 416 may be as long as needed. In some embodiments, the tab 422 is at least 1 cm long from end to end 424, 426, which provides a sufficient length for gripping, hooking, clasping, etc.

According to an exemplary embodiment, the adhesive cover 416 is bonded to an exterior side 428 (e.g., additional surface) of the connector 410, in addition to the end face 412 of the connector 410. Bonding to the exterior side 428 increases the pulling load of the tab 422. In some embodiments, the exterior side 428 is orthogonal to the end face 412; which, in combination with the end face 412, provides bonding to allow for pulling loads in two directions relative to the connector 410, vertical and horizontal.

In such embodiments, the exterior side 428 adjoins the end face 412 of the connector 410 with a corner 430 therebetween, and the tab 422 may extend from the connector 410 at the corner 430. In other contemplated embodiments, the tab 422 may be located on an end of the adhesive cover 416, such as on the distal end of the cover 416 overlaying the exterior side 428 and opposite to the portion of the cover 416 overlaying the end face 412 of the connector 410, which may allow for peeling of the cover 416 from the connector 410 in a single direction for removal.

The adhesive cover 416 (e.g., protective cover) for the fiber optic connector 410 may be installed at a factory and is intended to be removed before use of the fiber optic connector 410. According to an exemplary embodiment, the adhesive cover 416 utilizes a tape capable of withstanding temperature extremes encountered in shipping (e.g., remains bonded with temperature cycling between 32 to 85 Fahrenheit, 0 to 100 Fahrenheit, or even −30 to 115 Fahrenheit, 2-hour cycles, for at least 4 cycles, with zero humidity); and, in some embodiments, the tape provides advantages for easy grip and removal of the adhesive cover 416 by including a textured surface. Advantageously, the adhesive cover 416 provides a barrier that keeps particulate matter from contacting the end face 412 of the connector 410 and has an additional benefit of removing small amounts of particulate matter that may have been present of the end face 412 during installation. Text or color changes may be made to the tape. For example, the text could include instructive words such as "PULL" or "REMOVE BEFORE USE" or similar.

According to an exemplary embodiment, the region $R_1$, where the adhesive cover 416 is bonded to the exterior side 428 of the connector 410, allows the adhesive cover 416 to remain adhered to the side of the connector body, despite a horizontal pulling load P, and without significantly loading the adhesive cover 416 in the region $R_2$, over the end face 412. According to an exemplary embodiment, the tab 422 is able to remain adhered to the connector 410 despite pulling loads P of at least 10 newtons (N) (e.g., at least about 2 pounds-force (lbs)) or even at least 20 N, in some embodiments, in the lengthwise direction of the connector 410. However, pulling load P exceeding 100 N (e.g., exceeding about 20 lbs) may remove the adhesive cover 416 or cause the adhesive to yield. As such, the tab 422 is intended to be easy to remove, but not too easy. By changing the length of coverage in the region $R_1$, the pulling load P capability of the adhesive cover 416 may be adjusted.

Figure 6:
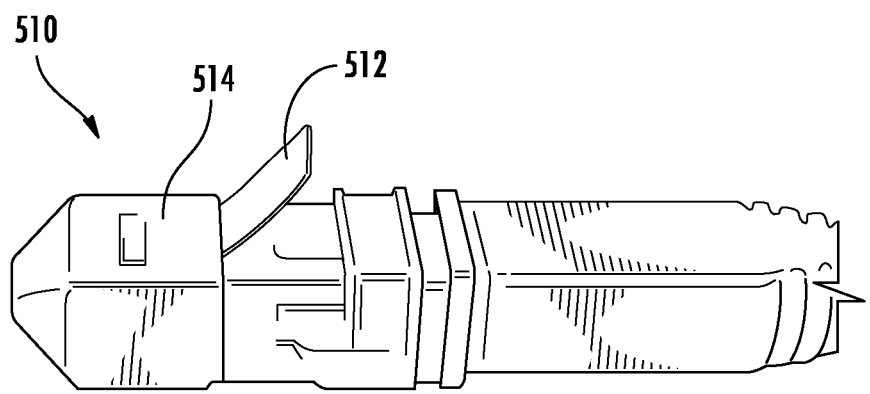
FIG. 6 is a perspective-view digital image of an MTP fiber optic connector having an end cap placed over an adhesive cover according to an exemplary embodiment.
Figure 7:
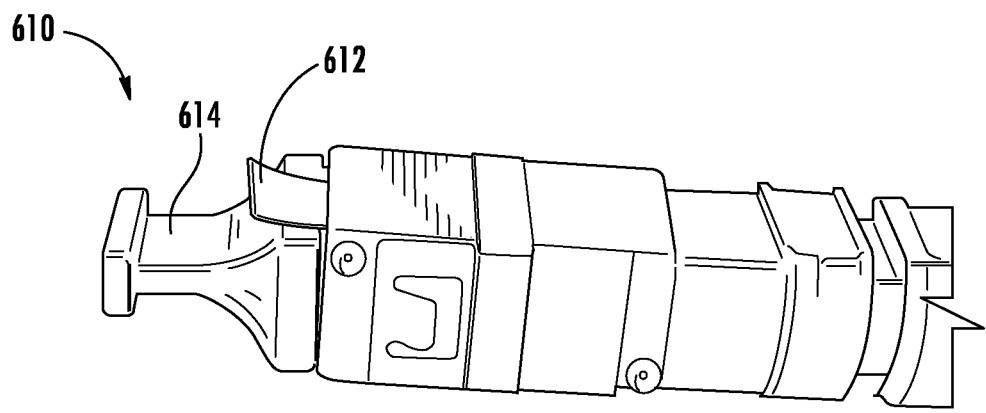
FIG. 7 is a digital image of an fiber optic adapter having an end cap placed over an adhesive cover according to an exemplary embodiment.

Referring to FIGS. 6-7, according to an exemplary embodiment, the adhesive cover 512, 612 is thin, including both substrate and adhesive agent. Is some such embodiments, the adhesive cover 512, 612 is less than 0.5 mm (e.g., less than about two hundredths of an inch) thick, which may be thin enough to fit under a conventional dust cap 514 or adapter cap 614 of a respective connector 510 or adapter 610, as shown in FIGS. 6-7. The width of the adhesive cover 512, 612 may be equal to or less than the width of the corresponding connector 510 or adapter 610, such as less than 25 mm wide (e.g., less than about an inch). The length of the adhesive cover 512, 612 may vary depending upon the length of the regions $R_1$, $R_2$, and the tab 422, for example.

A method of manufacturing a fiber optic assembly, such as the assembly 110, includes several steps. The steps may include extending an optical fiber through a ferrule of a fiber optic connector and to an end face of the connector, polishing an end of the optical fiber, and positioning the end of the optical fiber proximate to the end face of the connector (see FIGS. 2-4 and corresponding text). The steps may further include bonding an adhesive cover to the end face of a fiber optic connector, where the adhesive cover overlays the polished end of the optical fiber (see FIG. 5 and corresponding text). The adhesive cover may include a flexible polymeric substrate and an adhesive agent bonded to the substrate, where the adhesive agent is positioned between the substrate and the end face of the connector such that the adhesive agent bonds the adhesive cover to the connector.

Figure 8:
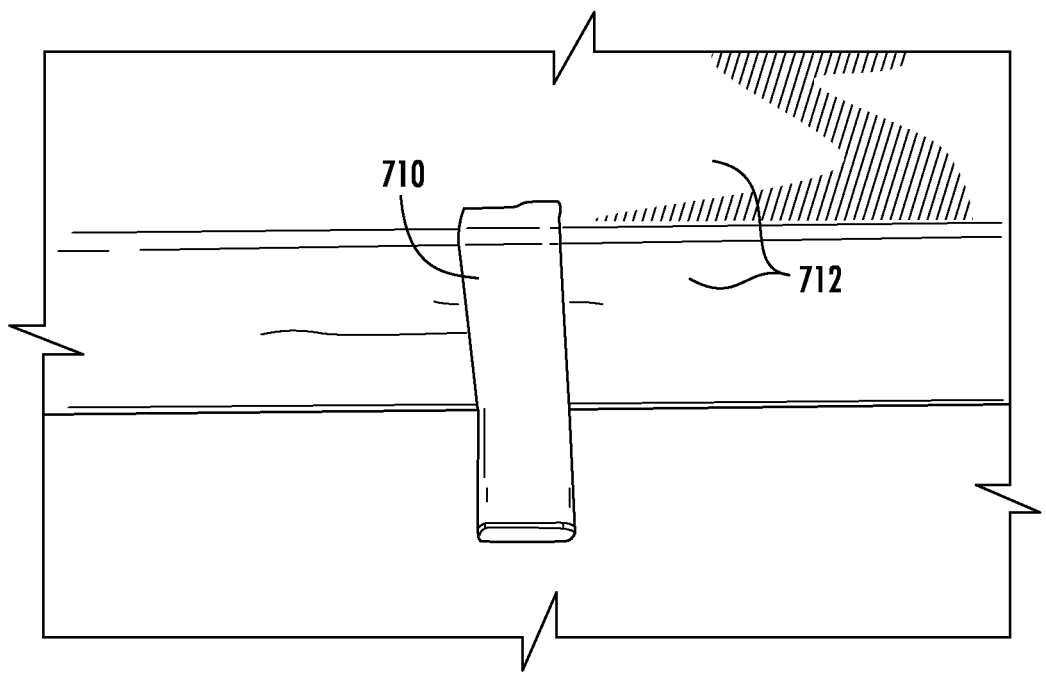
FIGS. 8-12 are digital images showing steps of attaching an adhesive cover to a fiber optic connector according to an exemplary embodiment.
Figure 9:
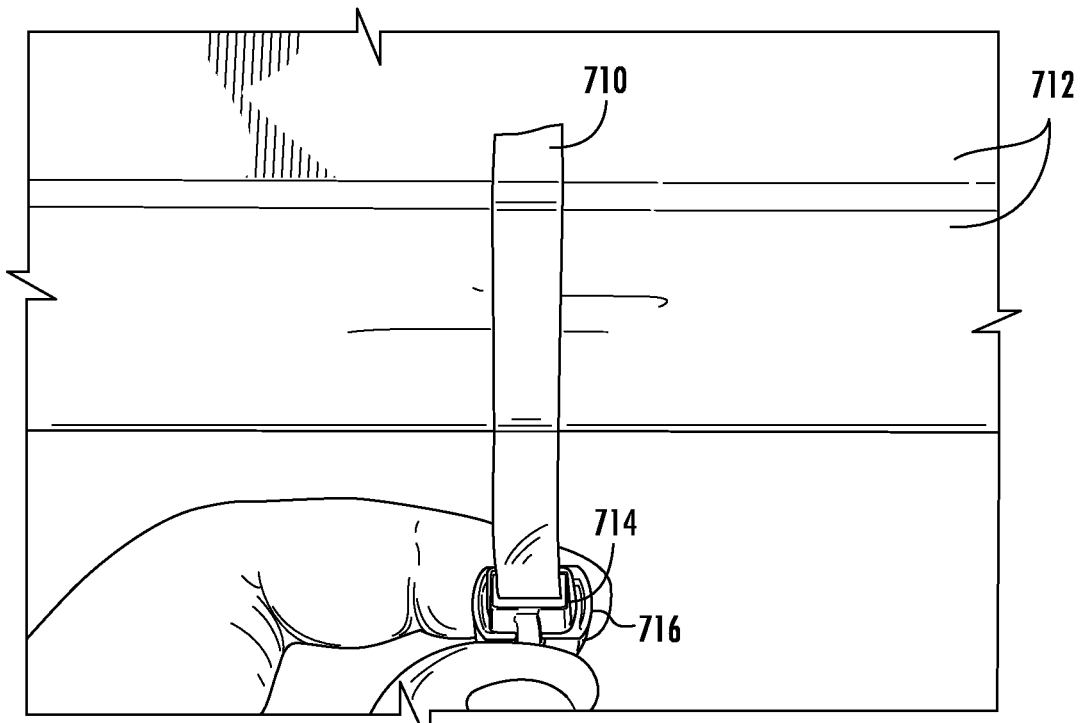
Figure 10:
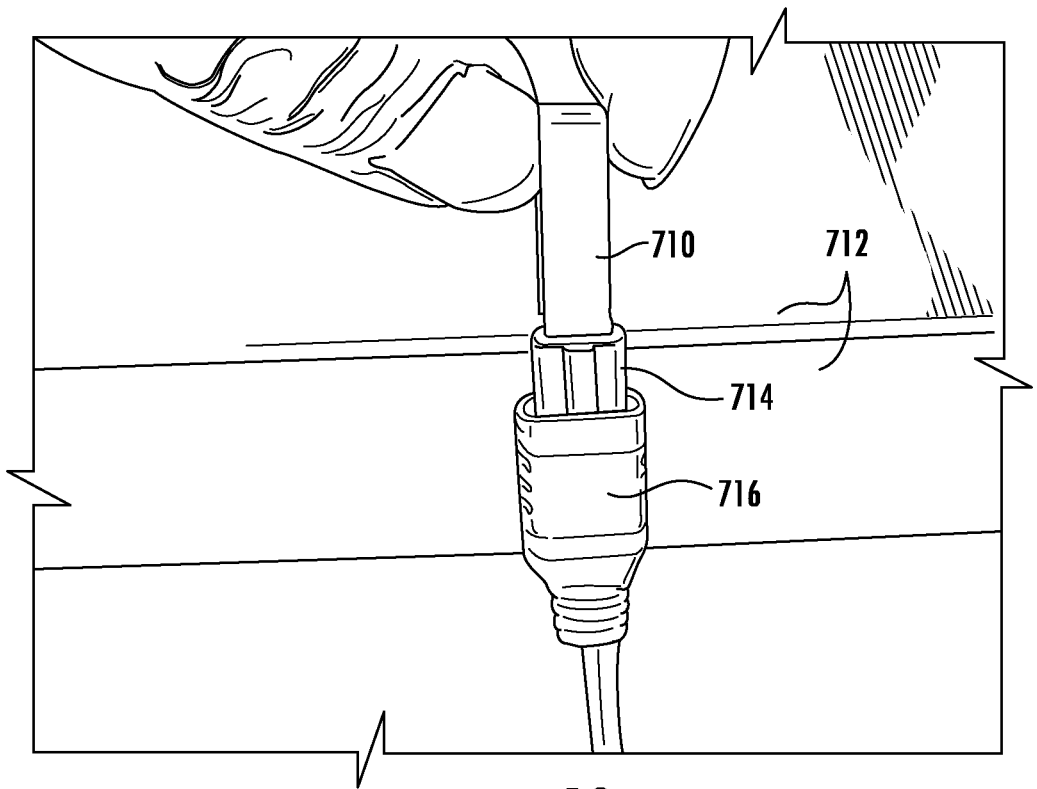
Figure 11:
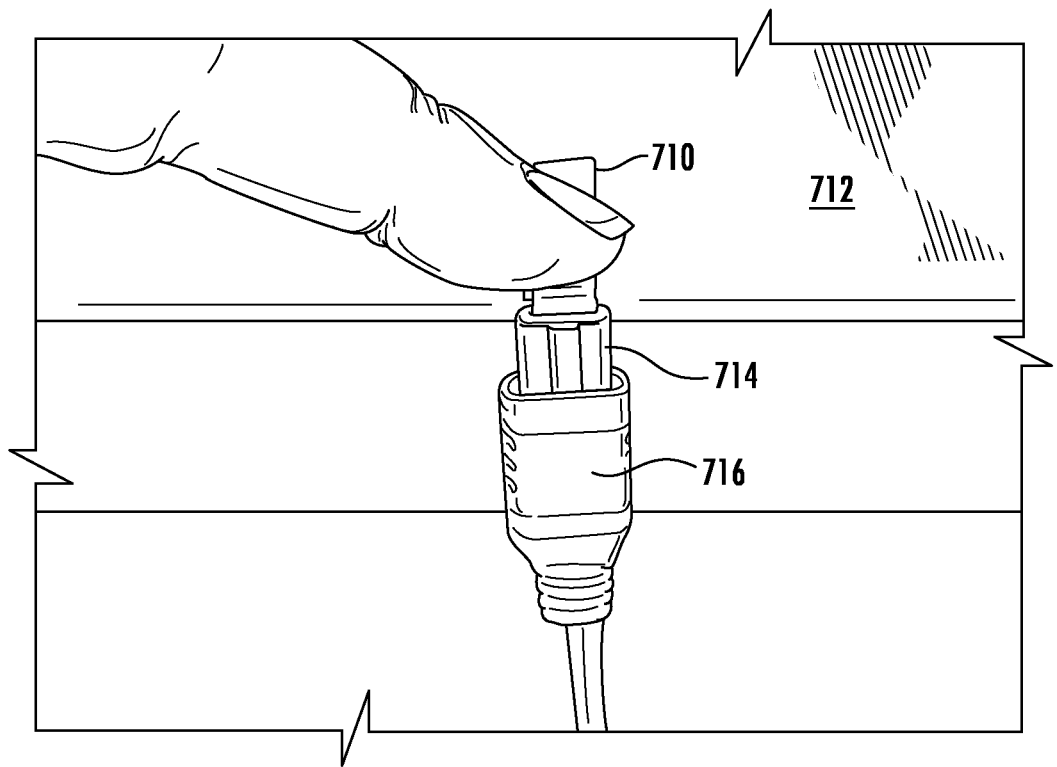
Figure 12:
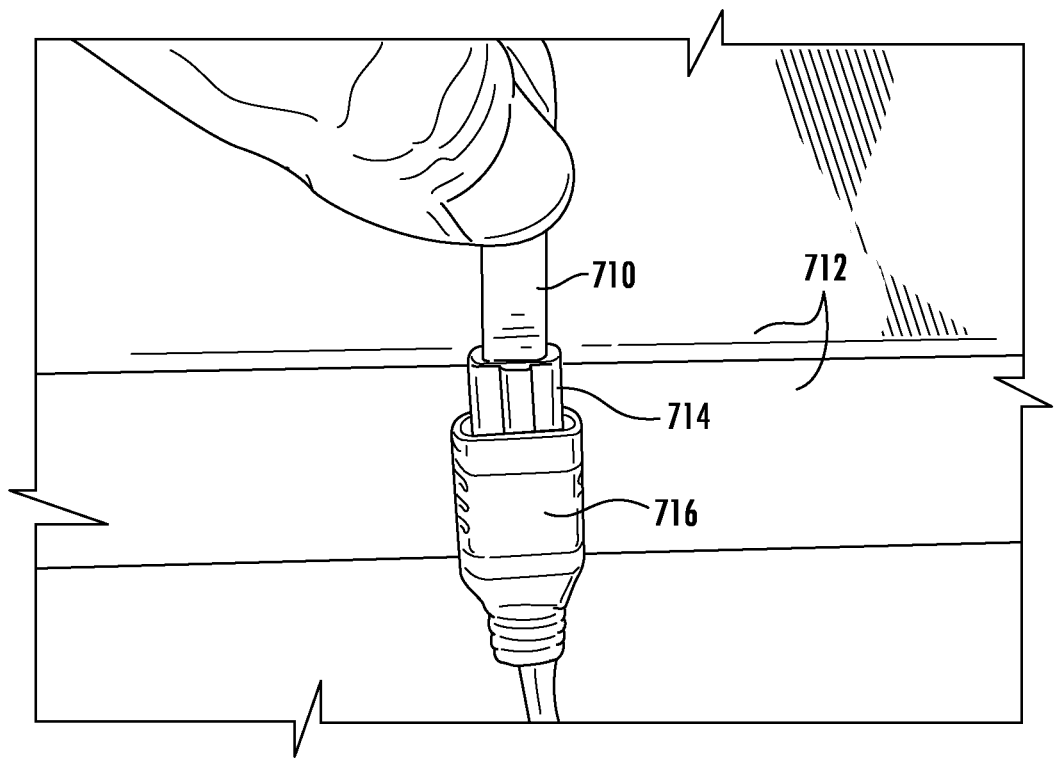

Referring now specifically to FIGS. 8-12, an operator has positioned in FIG. 8 tape 710 on a tabletop 712, and cut a strip of at least 50 mm and/or less than 200 mm (e.g., about 2-8 inches; or, in some embodiments, about 2-3 inches) of the tape 710 with a portion of the strip hanging below the side of the tabletop 712. In FIG. 9, the operator has placed the ferrule and connector 716 end face 714 on or near the bottom of the tape 710. The operator may use fingers to hold the end of the tape 710 (shown by red arrow) for easier application. In FIG. 10, the operator is using two fingers to grab the tape 710 from the middle of the tape 710, line the end face 714 flush with the tabletop 712, and pull the tape 710 as tightly as possible to get the tape 710 to stick together adjacent to the flush area, forming the tab (see tab 422 as shown in FIG. 5). In FIG. 11, the operator has let go of the tape 710 and is using one finger to smooth the tape 710 on the tabletop 712, removing air providing uniform and complete adhesion. The manufacture of the adhesive cover is complete in FIG. 12; where, while holding onto the connector 716, the operator pulls the remainder of the tape 710 off of the tabletop 712, applying more pressure to the table-end of the tape 710 and simultaneously using a finger to smooth out the tape 710 from the tabletop 712 onto the back exterior surface of the connector 716.

Accordingly, in some embodiments, the method of manufacturing such a fiber optic assembly additionally includes a step of pressing the adhesive cover to the end face of the connector such that the adhesive cover directly contacts the polished end of the connector with no air gaps present between the adhesive cover and the polished end of the optical fiber (see FIGS. 5 and 9). The method may include a step of folding a portion of the flexible polymeric substrate such that the adhesive agent is sandwiched between the substrate to form a tab, where the tab is at least 1 cm long, providing a lifting surface for removal of the adhesive cover from the connector. In some embodiments, the method includes a step of bonding the adhesive cover to an exterior side of the connector in addition to the end face of the connector. The exterior side may orthogonal to the end face, as discussed above.

Figure 13:
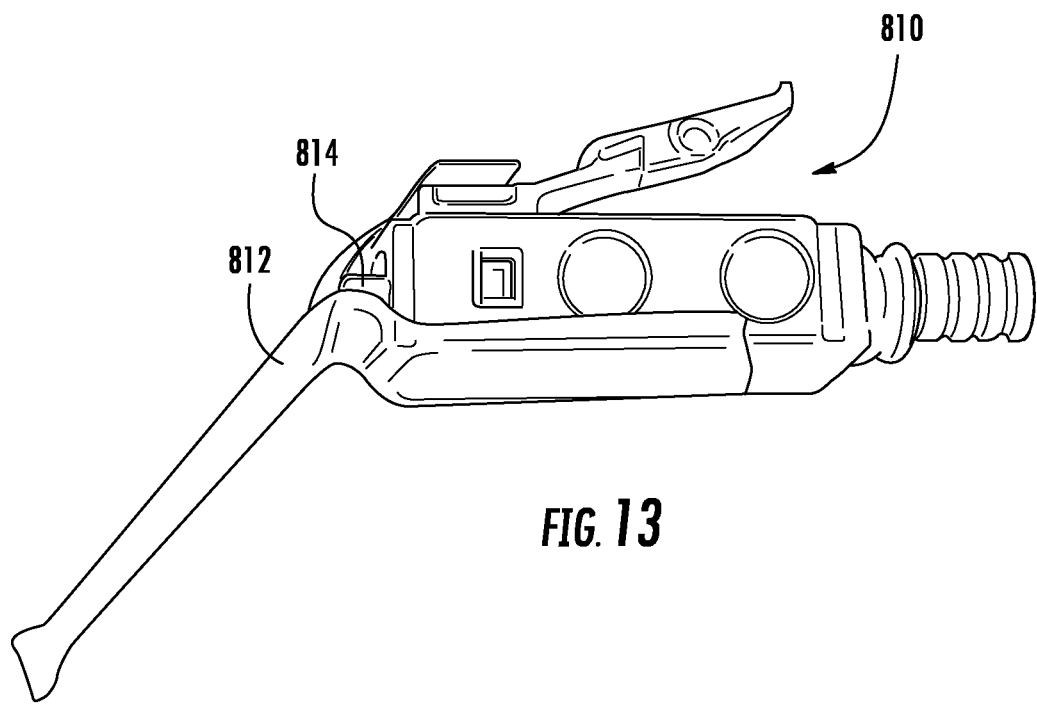
FIG. 13 is a digital image of an local connector (LC) fiber optic connector having an adhesive cover according to an exemplary embodiment.

Although embodiments shown in FIGS. 1-12 are developed for MTP/MTO-style connectors, disclosure of adhesive covers provided herein may, in alternate embodiments, be used on other types of connectors. Referring now to FIG. 13, an LC connector 810 includes an adhesive cover 812 overlaying a polished optical fiber in a ferrule 814 on the end face of the connector 810. In other contemplated embodiments, adhesive covers, as disclosed herein, may be used with still other types of fiber optic connectors, including fiber-optic and copper hybrid connectors (or simply copper connectors), where the adhesive cover protects the copper lead from scratching, dust, and removes dust upon removal.

As shown in FIG. 13, the adhesive cover 812 includes tape, similar to tape disclosed above, which bonds over round and smaller shapes of single-fiber ferrules 814. Such bonding may utilize some stretching/conforming of the tape over the respective ferrules 814. The adhesive cover 812 in this instance could be covered by another protective cap, as shown in FIGS. 2 and 6-7. However, modifications may be needed to existing dust cap designs to ensure a tight fit around the tape. For example, with such modifications, the inner-diameter and over-all length of the end cap may be changed so that the tape is not stretched too far.

Large ferrules such as SC/FC ferrules may benefit from a fold over on the flat end face, as shown in FIG. 13. In other contemplated embodiments, an adhesive cover may include a thin spirally-wound tape for round ferrules. The spirally-winding attachment is intended to add surface area to the bonding, which provides additional pull resistance, particularly for smaller ferrules. However, manually wrapping the tape in a spiral fashion may be very difficult and such a process may benefit from automation.

Figure 14:
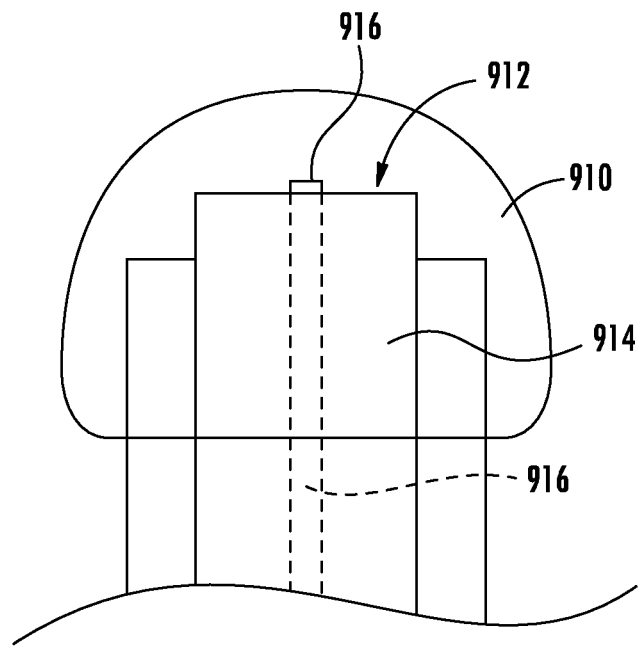
FIG. 14 is a schematic diagram of a fiber optic connector and a cover bonded thereto according to an exemplary embodiment.

Referring to FIG. 14, an adhesive cover 910 includes an adhesive sealant, such as a plasti-dip flexible rubberized coating (e.g., PERFORMIX® by Plasti-Dip International), where the adhesive cover 910 is applied and provided to protect a connector end face 912 and/or ferrule 914 supporting an optical fiber 916. A plasti-dip coating, for example, may utilize room temperature curing to form the rubberized coating and to create a form fitting (i.e. end-face matching) seal around the end face. Preexisting, standard rigid dust caps, as shown in FIGS. 2 and 6-7, may be used as the form (e.g., mold) around the rubberized coating. As such, plasti-dip, or a similar liquid, quick-curing polymeric adhesive sealant, may be poured into an end cap, and the end cap may then be placed over the connector end face 912 for curing and sealing optical fiber 916 at a factory. Upon installation, the cap may be removed and the polymer peeled off.

In still other embodiments, the adhesive cover 910 includes an adhesive sealant in the form of hot glue or another thermoplastic that becomes liquid when heated and re-solidify when cooled. Such an approach may be conceptually similar to the above plasti-dip embodiment. However, hot glue may be easier to apply with quicker curing (seconds instead of minutes), and hot glue is semi-transparent, which enables light checks with the adhesive cover 910 in place. The hot glue may also use an end cap for a mold, as discussed above with regard to plasti-dip.

Advantages of embodiments of the adhesive cover disclosed herein include: (1) eliminating a need to clean connectors during installation, which results in time savings to installers as well as reduced risks of damaging the connectors, (2) ease of removal with a tab (e.g., pull handle) integrated with the cover as part of the solution, (3) removal of particulate matter that may have been present on the end face of the connector at the factory, when the cover is peeled off, (4) relatively low cost materials for the cover, (5) installable without custom tools, and (6) where the cover works well with existing hardware, including conventional dust caps.

Figure 15:
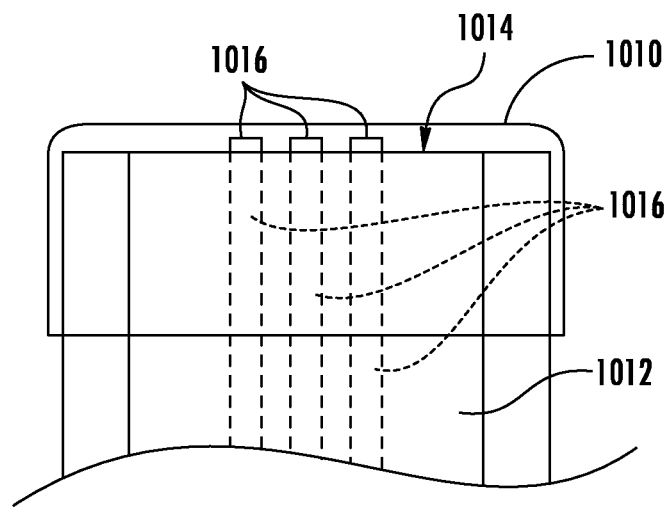
FIG. 15 is a schematic diagram of a fiber optic connector and a cover bonded thereto according to another exemplary embodiment.

Referring to FIG. 15, a cover 1010 is bonded to the fiber optic connector 1012 without an adhesive. In some embodiments, the cover 1010 includes a heat shrink (e.g., sock- or cup-shaped) that is placed over the end face 1014 and shrunk to the end face 1014 for bonding. In other embodiments, the cover includes a shrink wrap, which is wrapped about the end face 1014 and shrunk to the end face 1014. In both such embodiments, the cover 1010 is bonded by heating the cover 1010 to shrink the cover 1010 and to form an air-tight seal between the cover 1010 and the end face 1014, thereby protecting the optical fiber 1016. Another cap (e.g., rigid dust cap) may be placed over the cover 1010, as discussed above with other embodiments disclosed herein.

In still other embodiments, a polymeric cover may be bonded to an end face of a fiber optic connector, as disclosed herein (e.g., overlaying and/or directly contacting the polished end of an optical fiber), with a static electrical charge. The static charge and vacuum bonds the cover in place. In some such embodiments, the cover may be similar in structure to the tape described above and shown in FIG. 5, but with static charge used to bond the cover to the connector end face in place of an adhesive agent. The static charge may also be used to lift and draw particulates from the connector end face upon removal of the cover.

The construction and arrangements of the fiber optic assembly and adhesive cover, as shown in the various exemplary embodiments, are illustrative only. Although only a few embodiments have been described in detail in this disclosure, many modifications are possible (e.g., variations in sizes, dimensions, structures, shapes, and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A fiber optic assembly, comprising:
   a connector comprising a ferrule, wherein an optical fiber extends through the ferrule and to an end face of the connector, and wherein an end of the optical fiber is polished proximate to the end face of the connector;
   an adhesive cover bonded directly to the end face of the connector, wherein the adhesive cover overlays the polished end of the optical fiber and is configured draw loose particulates of dust and debris from the end face of the connector upon removal; and
   an end cap positioned over a portion of the connector and the adhesive cover;
   wherein:
      the adhesive cover is bonded to an exterior side of the connector in addition to the end face of the connector,
      the adhesive cover includes an exposed portion that is not bonded directly to the connector and that defines a terminal end of the adhesive cover,
      the exposed portion extends from an interface between the end cap and the connector, and
      the exposed portion is configured to allow for peeling of the adhesive cover from the connector in a single direction for removal.

2. The fiber optic assembly of claim 1, wherein the adhesive cover comprises a tape.

3. The fiber optic assembly of claim 2, wherein the adhesive cover comprises a flexible polymeric substrate and an adhesive agent bonded to the substrate, and further wherein the adhesive agent is positioned between the substrate and the end face of the connector.

4. The fiber optic assembly of claim 3, wherein bonding between the adhesive agent and the substrate is greater than bonding between the adhesive agent and the polished end of the optical fiber such that, upon removal of the cover from the connector, the polished end of the optical fiber is completely free of residue from the adhesive agent.

5. The fiber optic assembly of claim 3, wherein the exposed portion of the adhesive cover comprises a tab that includes two layers of the substrate with the adhesive agent therebetween.

6. The fiber optic assembly of claim 1, wherein at least five additional optical fibers extend through the ferrule and are spaced apart and linearly aligned with one another on the end face of the connector.

7. The fiber optic assembly of claim 1, wherein the adhesive cover provides an airtight seal that isolates the polished end of the optical fiber from environment surrounding the end face of the connector.

8. The fiber optic assembly of claim 1, wherein the adhesive cover directly contacts the end face of the connector such that no air gaps are present between the adhesive cover and the polished end of the optical fiber.

9. The fiber optic assembly of claim 1, wherein a portion of the ferrule laterally surrounds the polished end of the optical fiber, and wherein the adhesive cover directly contacts and is bonded to the portion of the ferrule.

10. A method of manufacturing a fiber optic assembly, comprising steps of:
    extending an optical fiber through a ferrule of a fiber optic connector and to an end face of the connector;
    polishing an end of the optical fiber;
    positioning the end of the optical fiber proximate to the end face of the connector;
    bonding an adhesive cover to the end face of a fiber optic connector, wherein the adhesive cover overlays the polished end of the optical fiber and is bonded to an exterior side of the connector in addition to the end face of the connector; and
    positioning an end cap over a portion of the connector and the adhesive cover, wherein the adhesive cover includes an exposed portion that is not bonded directly to the connector and that defines a terminal end of the adhesive cover, and further wherein the exposed portion extends from an interface between the dust cap and the connector such that the exposed portion is configured to allow for peeling of the adhesive cover from the connector in a single direction for removal.

11. The method of claim 10, wherein the adhesive cover comprises a tape.

12. The method of claim 11, wherein the adhesive cover comprises a flexible polymeric substrate and an adhesive agent bonded to the substrate, and further wherein the adhesive agent is positioned between the substrate and the end face of the connector.

13. The method of claim 12, further comprising:
    folding at least some of the exposed portion to form a folded-over region of the adhesive cover where the adhesive agent is sandwiched between portions of the flexible polymeric substrate.

14. A fiber optic assembly, comprising:
    a connector comprising a ferrule, wherein an optical fiber extends through the ferrule and to an end face of the connector, and wherein an end of the optical fiber is polished proximate to the end face of the connector;
    an adhesive cover bonded directly to the end face of the connector, wherein the adhesive cover comprises a tape that overlays the polished end of the optical fiber and is configured draw loose particulates of dust and debris from the end face of the connector upon removal; and
    an end cap positioned over a portion of the connector and the tape;
    wherein the tape is bonded to an exterior side of the connector in addition to the end face of the connector, and further wherein the tape includes a portion that is exposed from an interface between the end cap and the connector so as to allow for peeling of the tape from the connector in a single direction for removal.

* * * * *